US010969299B2

(12) United States Patent
Liu et al.

(10) Patent No.: US 10,969,299 B2
(45) Date of Patent: Apr. 6, 2021

(54) LENS REFRACTIVE INDEX DETECTION DEVICE AND METHOD

(71) Applicant: NINGBO FLO OPTICAL TECHNOLOGY DEVELOPMENT CO., LTD., Ningbo (CN)

(72) Inventors: Yibing Liu, Ningbo (CN); Zhao Sun, Ningbo (CN); Liwei Liu, Ningbo (CN)

(*) Notice: Subject to any disclaimer, the term of this patent is extended or adjusted under 35 U.S.C. 154(b) by 0 days.

(21) Appl. No.: 16/718,210

(22) Filed: Dec. 18, 2019

(65) Prior Publication Data
US 2021/0072113 A1 Mar. 11, 2021

(30) Foreign Application Priority Data
Sep. 10, 2019 (CN) .......................... 201910851194.9

(51) Int. Cl.
*G01M 11/02* (2006.01)
*G02B 27/30* (2006.01)
*G01B 11/06* (2006.01)

(52) U.S. Cl.
CPC .... *G01M 11/0228* (2013.01); *G01M 11/0207* (2013.01); *G01B 11/06* (2013.01); *G02B 27/30* (2013.01)

(58) Field of Classification Search
CPC .......... G01M 11/0228; G01M 11/0207; G01B 11/06; G02B 27/30
USPC ................................................. 356/124–137
See application file for complete search history.

(56) References Cited

U.S. PATENT DOCUMENTS

2013/0010286 A1* 1/2013 Zhao .................. G01M 11/025
356/73

* cited by examiner

*Primary Examiner* — Tri T Ton
(74) *Attorney, Agent, or Firm* — W&K IP (57) ABSTRACT

A lens refractive index detection device is disclosed which has a light source module, a lens center physical thickness detection module and a lens center optical thickness detection module. The light source module includes a first light source component and a second light source component for outputting a collimated light beam, a first light combining component, and a focusing component. The lens center physical thickness detection module includes a first imaging component and a second imaging component. The lens center optical thickness detection module includes a first photodetection component and a second photodetection component, a beam splitting component, a partial reflection mirror, and a movable reflection mirror. The lens refractive index detection device enables simple operation, fast and non-destructive on-line detection, and is also applicable to lenses with irregular surfaces, such as aspherical lenses, cylindrical lenses, and finished lenses. A lens refractive index detection method is also provided.

9 Claims, 3 Drawing Sheets

LENS REFRACTIVE INDEX DETECTION DEVICE AND METHOD

CROSS-REFERENCE TO RELATED APPLICATIONS

This application claims priority to Chinese Patent Application No. 201910851194.9 with a filing date of Sep. 10, 2019. The content of the aforementioned application, including any intervening amendments thereto, are incorporated herein by reference.

TECHNICAL FIELD

The disclosure relates to the technical field of optical lens parameter detection, and in particular to a lens refractive index detection device and method.

BACKGROUND

The refractive index parameter is an important parameter index of optical lenses. In order to ensure good imaging quality of the optical system, the refractive index of optical materials needs to be accurately measured. At present, the high-precision measurement of the refractive index of optical glass materials is detected by the minimum deflection angle method, but the premise of the detection by the minimum deflection angle method is that the optical glass to be measured is made into a triangular prism to refract light, and the angles of the triangular prism need to be accurately detected at the same time. Therefore, although the minimum deflection angle method to detect the refractive index of optical glass materials is a direct detection method, it has the following technical problems: 1. It is necessary to destroy the optical element, which is obviously unsuitable for the detection of a finished lens. 2. It is difficult and time-consuming to make prisms. For different batches and different materials of optical glass, corresponding prisms need to be made separately and the detection efficiency is low. 3. The prism used in the test is not applicable for detection of irregular aspherical lenses, cylindrical lenses and other asymmetrical lenses. The minimum deflection angle method is more suitable for glass manufacturers to test the same batch of raw glass, but not for online high-precision testing of finished lenses. For example, the refractive index detection of spectacle lenses requires that the detection of its refractive index and its material properties is achieved when the optical component material is not known and the optical element itself is not to be damaged to achieve, thereby determining its material properties.

At present, there are mainly two kinds of refractive index detection methods for finished lenses: one is to perform inverse calculation according to the refractive power formula, that is, to measure the curvature of the front and back surface, the center thickness and the power of the lens using mechanical precision measurement method. The formula calculates the refractive index of its wavelength. This method is complicated and difficult to operate. It is difficult to guarantee the measurement accuracy, and it is not suitable for measuring aspheric lenses. Another method is to change the "environment" refractive index by changing the refractive index of the medium contacting with the front and back surfaces of the lens. For example, one may place the lens in a solution with a known refractive index, or attaching a flexible medium with a known refractive index to the front and rear surfaces of the lens, and respectively detect the optical power of the lens in the air and in the solution. The refractive index of the lens can be calculated by the change of the refractive power and the refractive index of the solution. This method is also complicated to operate and difficult to detect.

SUMMARY

The technical problem to be solved by the present disclosure is to provide a lens refractive index detection device that is simple to operate, fast and offers non-destructive online and indirect detection. It is also applicable to irregular surface lenses such as aspheric lenses, cylindrical lenses, and finished lenses.

The technical solution of the present disclosure is: A lens refractive index detection device, comprising a light source module, a lens center physical thickness detection module, and a lens center optical thickness detection module, wherein the light source module includes a first light source component and a second light source component for outputting a collimated light beam, a first light combining component, and a focusing component, wherein the lens center physical thickness detection module includes a first imaging component and a second imaging component, and wherein the lens center optical thickness detection module includes a first photodetection component and a second photodetection component, a beam splitting component, a partial reflection mirror, and a movable reflection mirror, wherein the second photodetection component, the partial reflection mirror, the beam splitting component, the focusing component and the first light combining component are arranged along a first optical axis direction from front to back, wherein the movable reflection mirror is arranged on one side of the beam splitting component, the first photodetection component is disposed on the other side of the beam splitting component, and a focal surface of the focusing component is located between the beam splitting component and the partial reflection mirror for placing a measured lens, wherein the first imaging component and the second imaging component are respectively arranged above and below the measured lens, and the collimated light beams output by the first light source component and the second light source component both pass through the first light combining component and transmit along the first optical axis direction, a collimated beam transmitted by the first light source component along the first optical axis direction is focused by the focusing component on the measured lens while scattered light spots generated by the upper and lower surfaces of the measured lens are detected by the first imaging component and the second imaging component, wherein the focused light beam from the first light source component is also transmitted to the second photodetection component through the partial reflection mirror, and wherein the collimated light beam transmitted in the first optical axis direction from the second light source component passes through the beam splitting component and gets divided into two beams, one beam is projected on the movable reflection mirror and returns by reflection of the movable reflection mirror, and further transmitted by the beam splitter to the first photodetection component, the other beam is projected on the partial reflection mirror and returns by reflection of the partial reflection mirror, it is also reflected to the first photodetection component via the beam splitting component, and the two returned beams enter the first photodetection component for detecting an interference phenomena.

The working principle of the lens refractive index detection device of the present disclosure is as follows:

Before placing the measured lens, the steps include turning off a second light source component, turning on a first light source component, and monitoring the spot position of the light beam of the first light source component with the second photodetection component as a reference position for adjustment of the measured lens. Then the steps include placing the measured lens, monitoring the actual spot center position of the projected light beam with the second photoelectric detection component, comparing it with the reference position obtained before, and guiding the user to adjust the position of the lens according to the deviation between the two. When the actual spot center position coincides with the reference position, the center of the measured lens coincides with the center of the optical path, and the position adjustment of the measured lens is completed. Meanwhile, the collimated beam emitted by the first light source component is focused on the measured lens through the focusing component and generate light scattering on the upper and lower surfaces of the measured lens. The first imaging component and the second imaging component respectively image the scattered light on the upper and lower surfaces of the measured lens to achieve measurement of the space height of the scattered light spots on the upper and lower surfaces of the measured lens. The difference in space height of the scattered light spots on the upper and lower surfaces of the tested lens is the physical thickness D0 of the lens center. The steps further include turning off the first light source module, turning on the second light source module. The beam emitted by the module is divided into two beams by the beam splitting module. One beam is projected on the movable reflection mirror, reflected by the movable reflection mirror and returned in the same way. The other beam is projected on the partial reflection mirror, reflected by the partial mirror and returned in the same way. Both returned beams enter the first photodetection module through the beam splitting component. Then, the movable reflection mirror is moved to an appropriate position, that is, when the light path of light from the second light source component to the reflection mirror is exactly equal to the optical path to the partial reflection mirror, the light reflected by the movable reflection mirror and the light reflected by the partial reflection mirror will induce in the first photodetection module an interference phenomenon. Before inserting the measured lens, the position d1 of the movable reflection mirror is recorded when the interference phenomenon occurs in the first photodetection module and the movable reflection mirror is readjusted after inserting the measured lens to record the position d2 of the movable reflection mirror when the interference phenomenon occurs again in the first photodetection component. The difference between d2 and d1 is related to the optical thickness of the lens center. Relevant parameters d1 and d2 are used to calculate the refractive index of the measured lens, and the calculation formula is:

$$n = 1 + \frac{d2-d1}{D0}.$$

With the above structure, the present disclosure has the following advantages:

The lens refractive index detection device of the present disclosure calculates relevant parameters for the refractive index by detecting spatial height difference and interference phenomenon of scattered light spots generated by the focused light beam on the upper and lower surfaces of the measured lens. It is not necessary to make a prism or detect the related angle of the prism, which is an indirect detection method. Because it is not necessary to make the optical element to be measured into a prism, the operation is more convenient, and requires less time. Fast online detection can be achieved without the need to make a prism. No damage would be done to the optical components to be measured, so it is also suitable for the detection of finished lenses. The detection of spatial height difference of scattered light spots and interference phenomena is also applicable to irregular surface lenses such as aspherical lenses and cylindrical lenses.

Preferably, the first light combining component comprises a transflective first beam splitter, the first light source component is disposed behind the first beam splitter, and wherein the collimated light beam outputted by the first light source component is projected onto the first beam splitter along the first optical axis direction and then transmitted, wherein the second light source component is disposed on one side of the first beam splitter, and wherein the collimated light beam output by the second light source component is projected onto the first beam splitter along a second optical axis direction perpendicular to the first optical axis direction and then reflected, wherein an angle between the side of the first beam splitter and the second optical axis direction is 45° when the second light source component is disposed on the right side of the first beam splitter, and wherein the angle between the side of the first beam splitter and the second optical axis direction is 135° when the second light source component is disposed on the left side of the first beam splitter. The first light combining component has a simple structure, so that the collimated light beams output by the first light source component and the second light source component can be transmitted along the first optical axis direction only after one transmission or one reflection, and the energy loss of the light beam is small, which contributes to accurate and reliable detection.

Preferably, the first light source component includes a semiconductor laser, the semiconductor laser is disposed behind the first beam splitter, and a collimated light beam output by the semiconductor laser is projected onto the first beam splitter along the first optical axis direction and transmitted through the first beam splitter. The semiconductor laser is small in size, light in weight, reliable in operation, low in power consumption, and high in efficiency.

Preferably, the second light source component comprises one or more monochromatic LED test light sources, a light transmitting hole is provided in front of each of the monochromatic LED test light sources, a collimating lens is provided in front of each light transmitting hole, and each of the monochrome LED test light sources is provided on a back focus of the corresponding collimating lens so that the light beam emitted by each monochromatic LED test light source through the light transmitting hole passes through the collimating lens and becomes a collimated beam, wherein the collimated light beam output by the monochromatic LED test light source is projected to the first beam splitter in the second optical axis direction perpendicular to the first optical axis direction if the number of the monochromatic LED test light source is one, and the second light source component further includes a second light combing component disposed in front of the collimating lens for projecting each collimated beam output from each monochromatic LED test light source through a collimating lens in different directions onto the first beam splitter along a second optical axis direction perpendicular to the first optical axis direction if the number of the monochromatic LED test light sources is 2 or more. Monochromatic LED test light source has low cost, low energy consumption and safer use. Setting up a monochromatic LED test light source has low cost and simple structure. Setting multiple monochromatic LED test light sources can determine the refractive index of the measured lens at multiple wavelengths. Converting the monochromatic LED test light source into a collimated beam can make the optical path coupling more reliable. Converting the collimated beam output from each monochromatic LED test light source to the same optical path through a second light combining component can simplify the structure and further improve the reliability of optical path coupling.

Preferably, the number of the monochromatic LED test light sources is one, and the center of the first beam splitter, the center of the collimating lens, the center of the light transmitting hole, and the center of the monochromatic LED test light source are located on the second optical axis direction perpendicular to the first light axis direction. The structure is simple, and the collimated light beam emitted from a single monochromatic LED test light source can be projected onto the first beam splitter along a second optical axis direction perpendicular to the first optical axis direction.

Preferably, the number of the monochromatic LED test light sources is three, and respectively includes a first monochromatic LED test light source, a second monochrome LED test light source, and a third monochrome LED test light source, the first, second, and third monochrome LED test light sources emit green, yellow, and red light respectively, wherein the center of the first monochromatic LED test light source, a center of a corresponding first light transmitting hole, a center of the first collimating lens and the center of the first beam splitter are all located in a second optical axis direction perpendicular to the first optical axis direction, wherein the second light combining component includes a transflective second beam splitter disposed between the first collimating lens and the first beam splitter, a transflective third beam splitter between the first beam splitter the second beam splitter, wherein a center of the second monochromatic LED test light source, a center of a corresponding second light transmitting hole, a center of the second collimating lens, and the center of the second beam splitter are located on a third optical axis direction perpendicular to the second optical axis direction, the center of the third monochromatic LED test light source, a center of a corresponding third light transmitting hole, a center of a third collimating lens and the center of the third beam splitter are located in a fourth optical axis direction perpendicular to the second optical axis direction, and wherein an angle between the second beam splitter/third beam splitter and the second optical axis direction is 45° when the second monochromatic LED test light source/the third monochromatic LED test light source is positioned above the second optical axis direction, and wherein an angle between the second beam splitter/third beam splitter and the second optical axis direction is 135° when the second monochromatic LED test light source/the third monochromatic LED test light source is positioned below the second optical axis direction. The structure is simple, and can measure the refractive index of the measured lens at multiple wavelengths. It also calculates the dispersion coefficient based on the calculated refractive indices of three different wavelengths.

Preferably, the first imaging component and the second imaging component are both a camera with an oblique lens, an angle α between the optical axis direction of the oblique lens with respect to the first optical axis direction and an angle β between the optical axis direction of the oblique lens and the imaging chip plane of the camera meet the object-image conjugate relationship for oblique imaging of the imaging lens. The oblique lens has better imaging effect and the acquired image is more accurate.

Preferably, the beam splitting component comprises a transflective fourth beam splitter, a center of the first photodetection component, a center of the fourth beam splitter and the center of the movable reflection mirror are all located in a fifth optical axis direction perpendicular to the first optical axis direction, and wherein an angle between the side of the fourth beam splitter and the fifth optical axis direction is 45° when the movable reflection mirror is disposed on the left side of the fourth beam splitter, and wherein an angle between the side of the fourth beam splitter and the fifth optical axis direction is 135° when the movable reflection mirror is disposed on the right side of the fourth beam splitter. The beam splitting module has a simple structure and can easily and reliably implement an interference phenomenon.

Another technical problem to be solved by the present disclosure is to provide a method for detecting the refractive index of a lens that is simple in operation and enables online, fast and non-destructive indirect detection. It should also be applicable to irregular surface lenses such as aspheric lenses, cylindrical lenses, and finished lenses.

Another technical solution of the present disclosure is a method for detecting the refractive index of a lens, which includes the following steps:

a. turning off a second light source component before placing the measured lens, turning on a first light source component, and monitoring the spot position of the light beam of the first light source component with the second photodetection component as a reference position;

b. turning off the first light source component, turning on the second light source component, detecting an interference phenomenon by the first photodetection component, and recording the position d1 of the movable reflection mirror when the interference phenomenon occurs in the first photodetection component;

c. turning off the second light source component, inserting the measured lens, turning on the first light source component, and monitoring the actual light beam of the first light source component with the second photodetection component, the spot center position is compared with the reference position obtained in step a, and the user is guided to adjust the position of the measured lens according to the deviation between the two, when the position of the actual spot center of the light beam of the first light source component coincides with the reference position, the center of the measured lens coincides with the center of the optical path and the position adjustment of the measured lens is completed;

d. imaging the scattered light on the upper and lower surfaces of the measured lens by the first imaging component and the second imaging component respectively to find the spatial height of the scattered light spot on the upper and lower surfaces of the measured lens and the height difference between the scattered light spots on the upper and lower surfaces of the measured lens is the physical thickness D0 of the lens center;

e. turning off the first light source component, turning on the second light source component, readjusting the position of the movable reflection mirror and recording a position d2 of the movable reflection mirror when the interference phenomenon occurs again in the first photodetection component;

f. calculating the refractive index of the measured lens according to the lens center physical thickness D0 and the lens center optical thickness related parameters d1 and d2 with the calculation formula $$n = 1 + \frac{d2 - d1}{D0}.$$

After adopting the above method, the present disclosure has the following advantages:

The method for detecting the refractive index of a lens of the present disclosure is performed by detecting the scattered light spots generated by the focused beam on the upper and lower surfaces of the measured lens.

The lens refractive index detection device of the present disclosure calculates relevant parameters for the refractive index by detecting spatial height difference and interference phenomenon of scattered light spots generated by the focused light beam on the upper and lower surfaces of the measured lens. It is not necessary to make a prism or detect the related angle of the prism, which is an indirect detection method. Because it is not necessary to make the optical element to be measured into a prism, the operation is more convenient, and requires less time. Fast online detection can be achieved without the need to make a prism. No damage would be done to the optical components to be measured, so it is also suitable for the detection of finished lenses. The detection of spatial height difference of scattered light spots and interference phenomena is also applicable to irregular surface lenses such as aspherical lenses and cylindrical lenses.

Yet another technical problem to be solved by the present disclosure is to enable easy-to-operate, fast and non-destructive indirect online detection, capable of detecting refractive index and dispersion coefficient at multiple wavelengths for irregular surface types such as aspherical lenses, cylindrical lenses as well as finished lenses.

Another technical solution of the present disclosure includes a method for detecting refractive index of a lens, which includes the following steps:

A. turning off a second light source component, turn on a first light source component, and monitoring the spot position of the light beam of the first light source component with the second photodetection component as a reference position;

B. turning off the first light source component, turning on the first monochrome LED test light source, the second monochrome LED test light source, and the third monochrome LED test light source, the first, second, and third monochromatic LED test light sources emitting green, yellow, and red light, respectively, only one monochromatic LED test light source is turned on at the same time, the first photodetection component detects an interference phenomenon separately for each monochrome LED test light source, and records the positions d11, d12, d13 of the movable reflection mirror when the interference phenomenon occurs in the first photodetection component;

C. turning off all monochromatic LED test light sources, inserting the measured lens, turning on the first light source component, monitoring the actual spot center position of the light source component with the second photodetection component, the actual spot center position of the beam is compared with the reference position obtained in step A, and the user is guided to adjust the position of the measured lens according to the deviation between the two, when the actual spot center position coincides with the reference position, the center of the measured lens coincides with the center of the optical path, and the position adjustment of the measured lens is completed;

D. imaging the scattered light on the upper and lower surfaces of the measured lens by the first imaging component and the second imaging component respectively to find the spatial height of the scattered light spot on the upper and lower surfaces of the measured lens and the height difference between the scattered light spots on the upper and lower surfaces of the measured lens is the physical thickness D0 of the lens center;

E. turning off the first light source component, then turning on the first monochromatic LED test light source, the second monochromatic LED test light source and the third monochromatic LED test light source, at the same time, only one monochromatic LED test light source is turned on, readjusting and moving positions of the movable reflection mirror and recording the positions d21, d22, d23 of the movable reflection mirror in each of the three cases when the interference phenomenon occurs again in the first photodetection component;

F. calculating the refractive index nF, nd, and nC of the lens at different wavelengths according to the physical thickness D0 of the lens center and the parameters d11, d12, d13, d21, d22, and d23 of the lens center optical thickness with the formula $$nF = 1 + \frac{d21 - d11}{D0},$$

$$nd = 1 + \frac{d22 - d12}{D0},$$

$$nC = 1 + \frac{d23 - d13}{D0};$$

and then calculating a dispersion coefficient according to the refractive indices nF, nd, and nC with the formula $$Vd = \frac{nd}{nF - nC}.$$

By implementing the above method, the present disclosure has the following advantages:

The method for detecting the refractive index of a lens of the present disclosure calculates relevant parameters for refractive index by detecting spatial height difference of the scattered light spots generated by the focused beam on the upper and lower surfaces of the measured lens and an interference phenomenon. It is not necessary to make a prism or detect the angles of the prism. An indirect detection method is achieved. Because it is not necessary to make the measured optical element into a prism, the operation is more convenient, and shortens the detection period to enable fast online detection. Without the need to make a prism, no damage would be done to the optical components to be measured. Therefore it is also very suitable for the detection of finished lenses. Detection of the spatial height difference of scattered light spots and interference phenomena is also applicable to irregular surface lenses such as aspherical lenses and cylindrical lenses. In addition, the detection method detects the refractive index at multiple wavelengths and also the dispersion coefficients based on the refractive index at three wavelengths. More detection functionalities can be provided as a result.

In the picture: 1—first light source component, 2—second light source component, 3—first light combining component, 4—focusing component, 5—first imaging module, 6—second imaging module, 7—first photodetection component, 8—second photodetection component, 9—beam splitting component, 10—partial reflection mirror, 11—removable reflection mirror, 12—measured lens, 13—monochrome LED test light source, 13-1—first monochromatic LED test light source, 13-2—second monochromatic LED test light source, 13-3—third monochromatic LED test light source, 14—light transmitting hole, 14-1—first light transmitting hole, 14-2—second transmitting hole, 14-3—third transmitting hole, 15—collimating lens, 15-1—first collimating lens, 15-2—second collimating lens, 15-3—third collimating lens, 16—oblique lens, 17—camera, 18—frame, 19—second light combining module, 20—semiconductor laser, 21—first beam splitter, 22—second beam splitter, 23—third beam splitter, 24—fourth beam splitter, 25—first optical axis direction, 26—second optical axis direction, 27—third optical axis direction, 28—fourth optical axis direction, 29—fifth optical axis direction, 30—object plane, 31—image plane.

DETAILED DESCRIPTION

The present disclosure will be further described below with reference to the drawings and embodiments.

Embodiment 1

Figure 1:
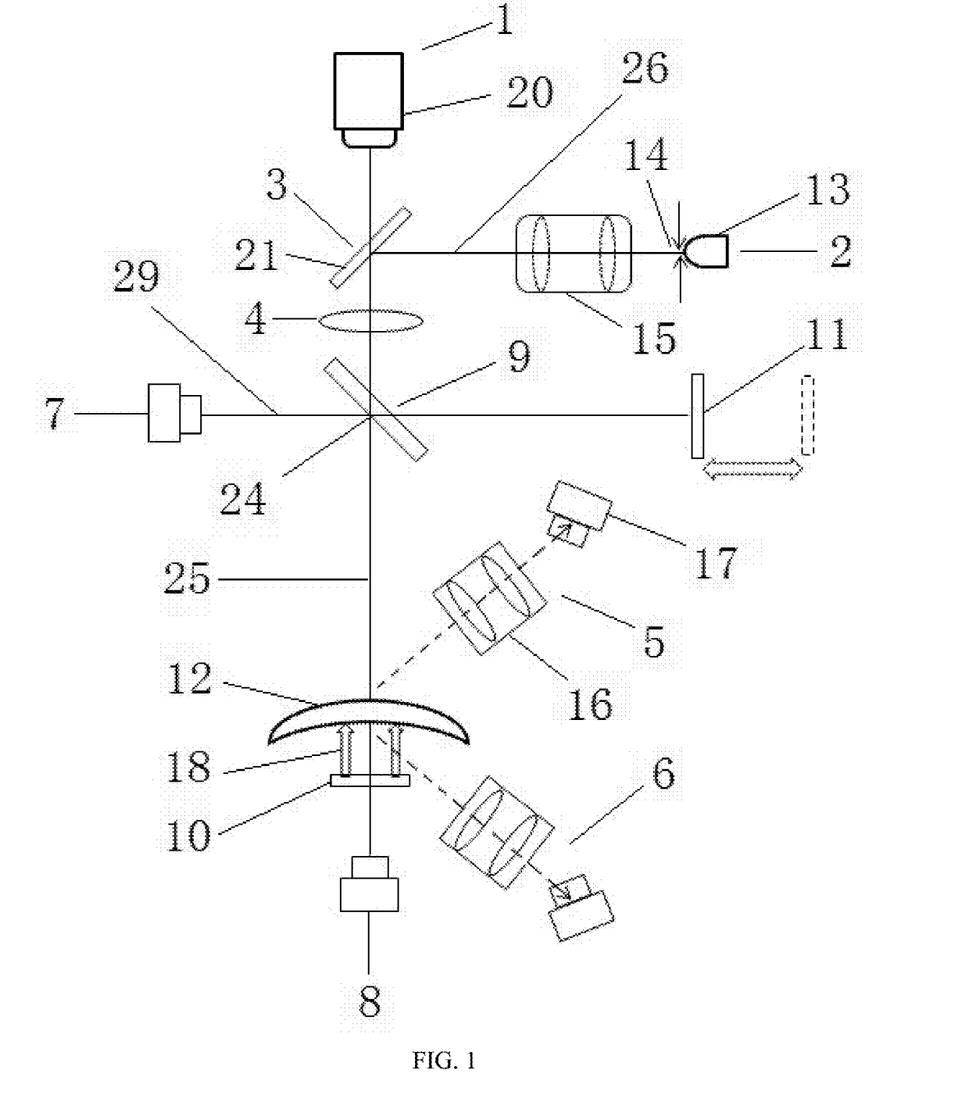
FIG. 1 is a lens refractive index detection device in Embodiment 1.

A lens refractive index detection device comprises a light source module, a lens center physical thickness detection module, and a lens center optical thickness detection module. The light source module includes a first light source component 1 and a second light source component 2 for outputting a collimated light beam, a first light combining component 3, and a focusing component 4. The lens center physical thickness detection module includes a first imaging component 5 and a second imaging component 6, and the lens center optical thickness detection module includes a first photodetection component 7 and a second photodetection component 8, a beam splitting component 9, a partial reflection mirror 10, and a movable reflection mirror 11. The second photodetection component 8, the partial reflection mirror 10, the beam splitting component 9, the focusing component 4 and the first light combining component 3 are arranged along a first optical axis direction 25 from front to back. The movable reflection mirror 11 is arranged on one side of the beam splitting component 9, the first photodetection component 7 is disposed on the other side of the beam splitting component 9, and a focal surface of the focusing component 4 is located between the beam splitting component 9 and the partial reflection mirror 10 for placing a measured lens 12. The first imaging component 5 and the second imaging component 6 are respectively arranged above and below the measured lens 12, and the collimated light beams output by the first light source component 1 and the second light source component 2 both pass through the first light combining component 3 and transmit along the first optical axis direction 25. A collimated beam transmitted by the first light source component 1 along the first optical axis direction 25 is focused by the focusing component 4 on the measured lens 12 while scattered light spots generated by the upper and lower surfaces of the measured lens 12 are detected by the first imaging component 5 and the second imaging component 6. The focused light beam from the first light source component 1 is also transmitted to the second photodetection component 8 through the partial reflection mirror 10, and the collimated light beam transmitted in the first optical axis direction 25 from the second light source component 2 passes through the beam splitting component 9 and gets divided into two beams. One beam is projected on the movable reflection mirror 11 and returns by reflection of the movable reflection mirror 11, and it is further transmitted by the beam splitting component 9 to the first photodetection component 7. The other beam is projected on the partial reflection mirror 10 and returns by reflection of the partial reflection mirror 10, and it is also reflected to the first photodetection component 7 via the beam splitting component 9. The two returned beams enter the first photodetection component 7 for detecting an interference phenomena.

The first light combining component 3 comprises a transflective first beam splitter 21. The first light source component 1 is disposed behind the first beam splitter 21, and the collimated light beam outputted by the first light source component 1 is projected onto the first beam splitter 21 along the first optical axis direction 25 and then transmitted. The second light source component 2 is disposed on one side of the first beam splitter 21, and the collimated light beam output by the second light source component 2 is projected onto the first beam splitter 21 along a second optical axis direction 26 perpendicular to the first optical axis direction 25 and then reflected. An angle between the side of the first beam splitter 21 and the second optical axis direction 26 is 45° when the second light source component 2 is disposed on the right side of the first beam splitter 21, and the angle between the side of the first beam splitter 21 and the second optical axis direction 26 is 135° when the second light source component 2 is disposed on the left side of the first beam splitter 21. The first light combining component 3 has a simple structure, so that the collimated light beams output by the first light source component 1 and the second light source component 2 can be transmitted along the first optical axis direction only after one transmission or one reflection, and the energy loss of the light beam is small, which contributes to accurate and reliable detection.

The first light source component 1 includes a semiconductor laser 20. The semiconductor laser 20 is disposed behind the first beam splitter 21, and a collimated light beam output by the semiconductor laser 20 is projected onto the first beam splitter 21 along the first optical axis direction 25 and transmitted through the first beam splitter 21. The semiconductor laser is small in size, light in weight, reliable in operation, low in power consumption, and high in efficiency.

The second light source component 2 includes a monochromatic LED test light source 13, which may be in the form of a patch package. The monochromatic LED test light source 13 may be of 530 nm/540 nm green light, 450 nm/480 nm blue light, or 610 nm/630 nm red light, etc. The refractive index at the wavelength of the monochromatic LED test light source 13 can be tested. A light transmitting hole 14 is provided in front of each of the monochromatic LED test light sources 13. A collimating lens 15 is provided in front of each light transmitting hole 14, and each of the monochrome LED test light sources 13 is provided on a back focus of the corresponding collimating lens 15, so that the light beam emitted by each monochromatic LED test light source 13 through the light transmitting hole 14 passes through the collimating lens 15 and becomes a collimated beam. The collimated light beam output by the monochromatic LED test light source 13 is projected to the first beam splitter 21 in the second optical axis direction 26 perpendicular to the first optical axis direction 25. The center of the first beam splitter 21, the center of the collimating lens 15, the center of the light transmitting hole 14, and the center of the monochromatic LED test light source 13 are located in a second optical axis direction 26 perpendicular to the first optical axis direction 25. The monochromatic LED test light source has low cost, low energy consumption and safer use. Deploying one monochromatic LED test light source allows for low cost and simple structure. Converting a monochromatic LED test light source into a collimated beam can provide more reliable the optical path coupling. The collimated light beam output from each monochromatic LED test light source is converted to the same optical path through the second light combining component, which can simplify the structure and further improve the reliability of the optical path coupling.

The focusing component 4 includes a focusing lens. The focusing component 4 has a simple structure.

Figure 3:
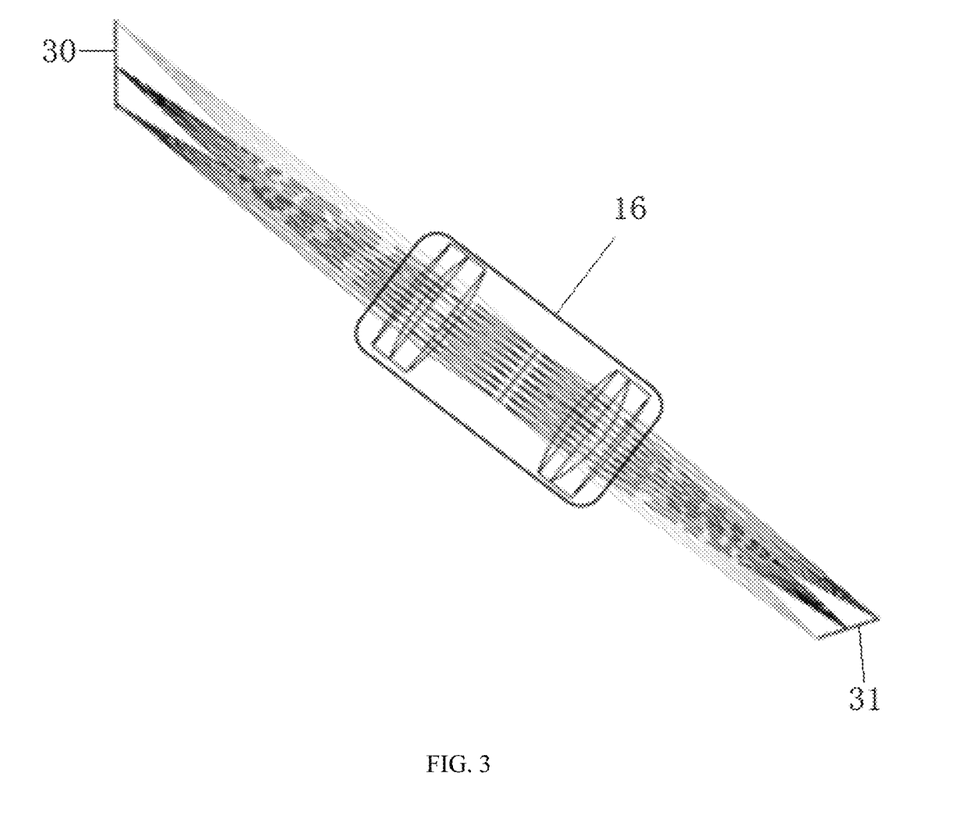
FIG. 3 is a conjugate object-image relationship diagram of oblique imaging of an imaging lens.

The first imaging component 5 and the second imaging component 6 are both cameras 17 with an oblique lens 16. An angle between the optical axis direction of the oblique lens 16 with respect to the first optical axis direction 25 and an angle between the optical axis direction of the oblique lens 16 and the imaging chip plane of the camera 17 meet the object-image conjugate relationship for oblique imaging of the imaging lens. As shown in FIG. 3, Obj represents the object plane 30 and Img represents the image plane 31. The image plane is the imaging chip plane of the first imaging component 5 or the second imaging component 6. The scattered light generated by the focused light beam output by the first light source component 1 on the upper and lower surfaces of the measured lens 12 passes through the two oblique lenses 16 in the two cameras 17 and gets focused on the plane of the imaging chip to generate an image. The first imaging component 5 is used to determine the spatial height of the intersection of the focused light beam of the first light source component 1 and the upper surface of the lens 12 to be measured. The second imaging component 6 is used to determine the spatial height of the intersection of the focused light beam of the first light source component 1 and the lower surface of the lens 12 to be measured. The spatial height difference at the intersection of the upper and lower surfaces is the physical thickness D0 of the lens center. The oblique lens 16 has a better imaging effect and the acquired image is more accurate.

The beam splitting component 9 comprises a transflective fourth beam splitter 24. A center of the first photodetection component 7, a center of the fourth beam splitter 24 and the center of the movable reflection mirror 11 are all located in a fifth optical axis direction 29 perpendicular to the first optical axis direction 25. An angle between the side of the fourth beam splitter 24 and the fifth optical axis direction 26 is 135° when the movable reflection mirror 11 is disposed on the right side of the fourth beam splitter 24. An angle between the side of the fourth beam splitter 24 and the fifth optical axis direction 26 is 45° when the movable reflection mirror 11 is disposed on the left side of the fourth beam splitter 24. The beam splitting module 9 has a simple structure, and can easily and reliably implement an interference phenomenon.

The first photodetection component 7 is an area-scan camera 17, a line-scan camera 17, or a photodiode. The first photodetection component 7 would have a good detection effect.

The second photodetection component 8 is a position-sensitive detector or an area-scan camera 17. The second photodetection component 8 would have a good detection effect.

The movable reflection mirror 11 can also be driven by a motor to move automatically. This configuration can realize the automatic movement of the movable reflection mirror 11, which is more convenient to use and more accurate.

The lens is fixed by a frame 18. This enables the lens to be stably fixed.

In this embodiment, the diameter of the collimated beam output by the semiconductor laser 20 is less than 3 mm, such as 1.5 mm, and the wavelength is greater than 650 nm. The spectral width of the monochromatic LED test light source 13 is 10 nm to 50 nm, and the central wavelength is 546 nm. The diameter of the light transmitting hole 14 is less than 0.5 mm, preferably the diameter of the light transmitting hole 14 is less than 0.2 mm, such as 0.15 mm. The distance between the light transmitting hole 14 and the monochromatic LED test light source 13 is less than 0.5 mm. The focal length of the collimating lens 15 is greater than 50 mm, preferably the focal length of the collimating lens 15 is greater than 100 mm. The focal length of the focusing lens is greater than 50 mm, preferably the focal length of the focusing lens is greater than 100 mm. The transmission and reflection ratio of the fourth beam splitter 24 to the light beam of the monochromatic LED test light source 13 is 1:1, and the light beam transmittance of the semiconductor laser 20 is greater than the reflectance. The partial mirror 10 has an upper surface which is a spectroscopic film. The light transmittance is greater than 80% for wavelengths greater than 650 nm, and the light reflectance is greater than 80% for wavelengths less than 640 nm. Therefore, the partial transmittance of the mirror 10 to the semiconductor laser 20 is greater than 80%. The color reflectance of the color LED test light source 13 is greater than 80%, and the lower surface of the partial reflector 10 is a full-spectrum antireflection coating. The light reflectance is less than 2% for a wavelength of 450 nm-800 nm. The distance from the second photodetection component 8 to the partial reflection mirror 10 is less than 30 mm.

The working principle of the lens refractive index detection device in this embodiment comprises the method steps as follows:

Before placing the measured lens 12, the steps include turning off a second light source component 2, turning on a first light source component 1, and monitoring the spot position of the light beam of the first light source component 1 with the second photodetection component 8 as a reference position for adjustment of the measured lens 12. Then the steps include placing the measured lens 12, monitoring the actual spot center position of the projected light beam with the second photoelectric detection component 8, comparing it with the reference position obtained before, and guiding the user to adjust the position of the lens 12 according to the deviation between the two. When the actual spot center position coincides with the reference position, the center of the measured lens 12 coincides with the center of the optical path, and the position adjustment of the measured lens 12 is completed. Meanwhile, the collimated beam emitted by the first light source component 1 is focused on the measured lens 12 through the focusing component 4 and generate light scattering on the upper and lower surfaces of the measured lens 12. The first imaging component 5 and the second imaging component 6 respectively image the scattered light on the upper and lower surfaces of the measured lens 12 to achieve measurement of the space height of the scattered light spots on the upper and lower surfaces of the measured lens. The difference in space height of the scattered light spots on the upper and lower surfaces of the tested lens 12 is the physical thickness D0 of the lens center. The steps further include turning off the first light source module 1, turning on the second light source module 2. The beam emitted by the module 2 is divided into two beams by the beam splitting module 9. One beam is projected on the movable reflection mirror 11, reflected by the movable reflection mirror 11 and returned in the same way. The other beam is projected on the partial reflection mirror 10, reflected by the partial mirror 10 and returned in the same way. Both returned beams enter the first photodetection module 7 through the beam splitting component 9. Then, the movable reflection mirror 11 is moved to an appropriate position, that is, when the light path of light from the second light source component 2 to the reflection mirror is exactly equal to the optical path to the partial reflection mirror, the light reflected by the movable reflection mirror 11 and the light reflected by the partial reflection mirror will induce in the first photodetection module 7 an interference phenomenon. Before inserting the measured lens 12, the position d1 of the movable reflection mirror 11 is recorded when the interference phenomenon occurs in the first photodetection module 7 and the movable reflection mirror is readjusted 11 after inserting the measured lens 12 to record the position d2 of the movable reflection mirror 11 when the interference phenomenon occurs again in the first photodetection component 7. The difference between d2 and d1 is related to the optical thickness of the lens center. Relevant parameters d1 and d2 are used to calculate the refractive index of the measured lens 12, and the calculation formula is:

$$n = 1 + \frac{d2 - d1}{D0}.$$

The lens refractive index detection device of the present disclosure calculates relevant parameters for the refractive index by detecting spatial height difference and interference phenomenon of scattered light spots generated by the focused light beam on the upper and lower surfaces of the measured lens 12. It is not necessary to make a prism or detect the related angle of the prism, which is an indirect detection method. Because it is not necessary to make the optical element to be measured into a prism, the operation is more convenient, and requires less time. Fast online detection can be achieved without the need to make a prism. No damage would be done to the optical components to be measured, so it is also suitable for the detection of finished lenses. The detection of spatial height difference of scattered light spots and interference phenomena is also applicable to irregular surface lenses such as aspherical lenses and cylindrical lenses.

Embodiment 2

A method for detecting the refractive index of a lens based on the lens refractive index detection device in Embodiment 1 includes the following steps:
(1) turning off a second light source component 2, turning on a first light source component 1, and monitoring the spot position of the light beam of the first light source component 1 with the second photodetection component 8 as a reference position;
(2) turning off the first light source component 1, turning on the second light source component 2, detecting an interference phenomenon by the first photodetection component 7, and recording the position d1 of the movable reflection mirror 11 when the interference phenomenon occurs in the first photodetection component 7;
(3) turning off the second light source component 2, inserting the measured lens 12, turning on the first light source component 1, and monitoring the actual light beam of the first light source component 1 with the second photodetection component 8, the spot center position is compared with the reference position obtained in step (1), and the user is guided to adjust the position of the measured lens 12 according to the deviation between the two, when the position of the actual spot center of the light beam of the first light source component 1 coincides with the reference position, the center of the measured lens 12 coincides with the center of the optical path and the position adjustment of the measured lens 12 is completed;
(4) imaging the scattered light on the upper and lower surfaces of the measured lens 12 by the first imaging component 5 and the second imaging component 6 respectively to find the spatial height of the scattered light spot on the upper and lower surfaces of the measured lens 12 and the height difference between the scattered light spots on the upper and lower surfaces of the measured lens 12 is the physical thickness D0 of the lens center;
(5) turning off the first light source component 1, turning on the second light source component 2, readjusting the position of the movable reflection mirror 11 and recording a position d2 of the movable reflection mirror 11 when the interference phenomenon occurs again in the first photodetection component 7; and
(6) calculating the refractive index of the measured lens 12 according to the lens center physical thickness D0 and the lens center optical thickness related parameters d1 and d2 with the calculation formula $$n = 1 + \frac{d2 - d1}{D0}.$$

Embodiment 3

Figure 2:
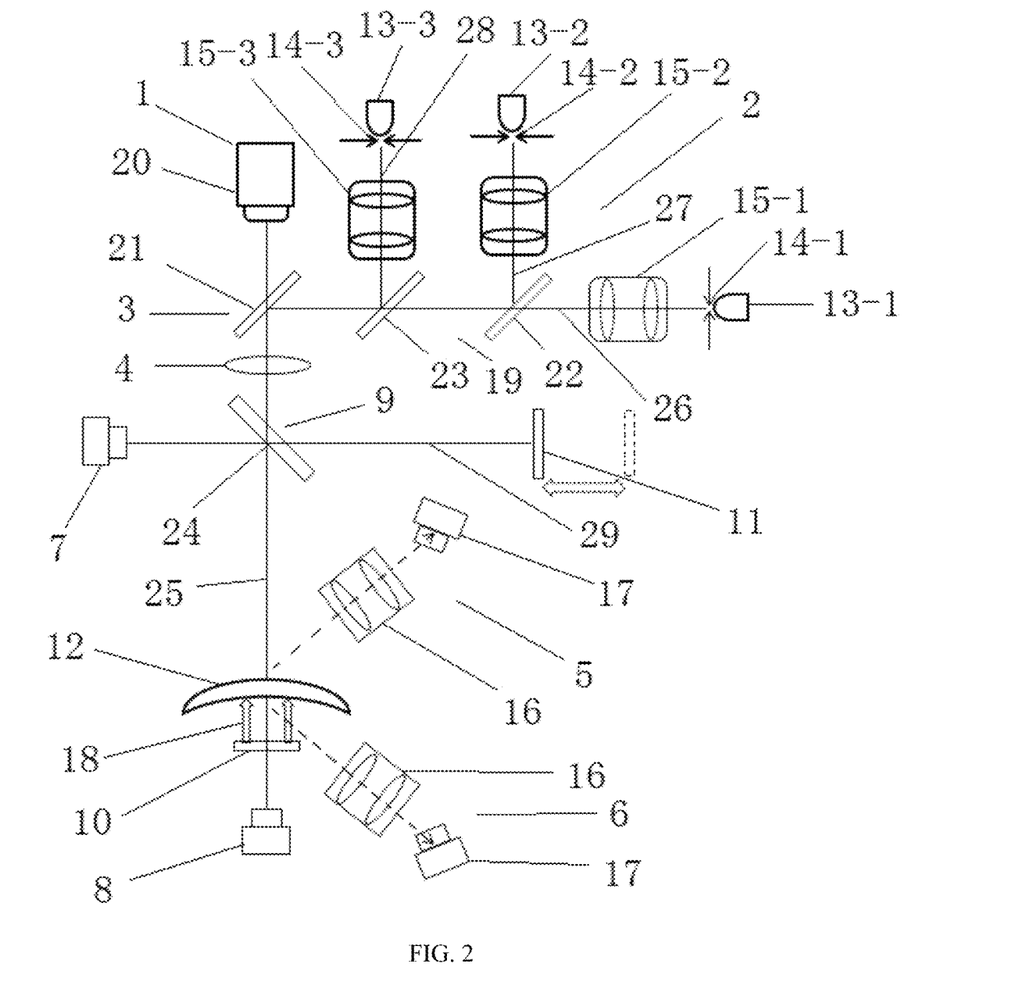
FIG. 2 is a lens refractive index detection device in Embodiment 3.

The other structures of this embodiment are the same as those of Embodiment 1, except that there is only one monochromatic LED test light source 13 in Embodiment 1, and the refractive index at only one wavelength can be detected. Two extra monochromatic LED test light sources 13 are added to this embodiment. In this embodiment, the first, second, and third monochromatic LED test light sources 13-1, 13-2, and 13-3 are configured to emit blue, yellow, and red light, whose corresponding wavelengths are 486 nm, 589 nm, and 656 nm, respectively. The refractive index of the measured lens 12 at these three wavelengths can be measured accordingly, which are nF, nd, and nC, respectively. The wavelength of the semiconductor laser 20 is greater than 680 nm. The three refractive indices can be obtained, and the Abbe number of the dispersion coefficient can be further calculated. The formula is as follows:

$$Vd = \frac{nd}{nF - nC}$$

The different technical features corresponding to the above improvements are as follows:

The second light source component 2 includes a plurality of monochrome LED test light sources 13. A light transmitting hole 14 is provided in front of each of the monochrome LED test light sources 13, and a collimating lens 15 is provided in front of each light transmitting hole 14. Each of the monochromatic LED test light sources 13 is disposed on a rear focal point of the corresponding collimating lens 15, and is configured to transfer the light beam, emitted by each of the monochromatic LED test light sources 13 through the light transmitting hole 14, through the collimating lens 15 into a collimated light beam. The second light source component 2 further includes a second light combining component 19 disposed in front of the collimating lens 15, which is used to project the collimated beam of each of the monochromatic LED test light sources 13 output through the collimating lens 15 in different directions onto the first beam splitter 21 in a second optical axis direction 26 perpendicular to the first optical axis direction 25 after passing through the second light combining component 19. The number of the monochromatic LED test light sources 13 is three, and it respectively includes a first monochromatic LED test light source 13-1, a second monochrome LED test light source 13-2, and a third monochrome LED test light source 13-3. The first, second, and third monochrome LED test light sources 13-1, 13-2, 13-3 emit green, yellow, and red light respectively. The center of the first monochromatic LED test light source 13-1, a center of a corresponding first light transmitting hole 14-1, a center of the first collimating lens 15-1 and the center of the first beam splitter 21 are all located in a second optical axis direction 26 perpendicular to the first optical axis direction 25. The second light combining component 19 includes a transflective second beam splitter 22 disposed between the first collimating lens 15 and the first beam splitter 21, and a transflective third beam splitter 23 between the first beam splitter 21 the second beam splitter 22. A center of the second monochromatic LED test light source 13-2, a center of a corresponding second light transmitting hole 14-2, a center of the second collimating lens 15-2, and the center of the second beam splitter 22 are located on a third optical axis direction 27 perpendicular to the second optical axis direction 26. The center of the third monochromatic LED test light source 13-3, a center of a corresponding third light transmitting hole 14-3, a center of a third collimating lens 15-3 and the center of the third beam splitter 23 are located in a fourth optical axis direction 28 perpendicular to the second optical axis direction 26. An angle between the second beam splitter 22/third beam splitter 23 and the second optical axis direction 26 is 45° in this embodiment where the second monochromatic LED test light source 13-2/the third monochromatic LED test light source 13-3 are positioned above the second optical axis direction 26. The angle between the second beam splitter 22/third beam splitter 23 and the second optical axis direction 26 would be 135° when the second monochromatic LED test light source 13-2/the third monochromatic LED test light source 13-3 are instead positioned below the second optical axis direction 26.

In this embodiment, the diameter of the collimated beam output by the semiconductor laser 20 is less than 3 mm, such as 1.5 mm, and the wavelength is greater than 680 nm, such as 685 nm, 780 nm, or 810 nm. The spectral width of the monochromatic LED test light source 13 is 10 nm-50 nm, and the center wavelength is 546 nm. The diameter of the light transmitting hole 14 is less than 0.5 mm. The distance between the light transmitting hole 14 and the monochromatic LED test light source 13 is less than 0.5 mm. The focal length of the collimating lens 15 is greater than 50 mm. The focal length of the focusing lens is also greater than 50 mm. The first beam splitter 21 transmits light with a wavelength greater than 680 nm and reflects light with a wavelength less than 675 nm. The second beam splitter 22 transmits light with a wavelength less than 530 nm and reflects light with a wavelength greater than 530 nm. The third beam splitter 23 transmits light with a wavelength less than 620 nm and reflects light with a wavelength greater than 620 nm. The fourth beam splitter 24 has a light transmittance greater than a light reflectance for light having a wavelength greater than 680 nm, and has approximately equal light reflectance and transmittance for a wavelength between 450 and 675 nm. The partial reflection mirror 10 has a light transmittance greater than 50% for light having a wavelength greater than 680 nm. For light with a wavelength less than 675 nm, its reflectance would be greater than 90%. The distance between the second photodetection component 8 and the partial reflection mirror 10 is less than 30 mm.

Embodiment 4

This embodiment involves a lens refractive index detection method. This embodiment is based on the lens refractive index detection device described in Embodiment 3. It includes the following steps:

(1) turning off a second light source component 2, turning on a first light source component 1, and monitoring the spot position of the light beam of the first light source component 1 with the second photodetection component 8 as a reference position;

(2) turning off the first light source component 1, turning on the first monochrome LED test light source 13-1, the second monochrome LED test light source 13-2, and the third monochrome LED test light source 13-3, the first, second, and third monochromatic LED test light sources 13-1, 13-2, 13-3 emitting green, yellow, and red light, respectively. Only one monochromatic LED test light source 13 is turned on at the same time. The first photodetection component 7 detects an interference phenomenon separately for each monochrome LED test light source 13, and records the positions d11, d12, d13 of the movable reflection mirror 11 when the interference phenomenon occurs in the first photodetection component 7;

(3) turning off all monochromatic LED test light sources 13, inserting the measured lens 12, turning on the first light source component 1, monitoring the actual spot center position of the light source component 1 with the second photodetection component 8. The actual spot center position of the beam is compared with the reference position obtained in step 1, and the user is guided to adjust the position of the measured lens 12 according to the deviation between the two. When the actual spot center position coincides with the reference position, the center of the measured lens 12 coincides with the center of the optical path, and the position adjustment of the measured lens 12 is completed;

(4) imaging the scattered light on the upper and lower surfaces of the measured lens 12 by the first imaging component 5 and the second imaging component 6 respectively to find the spatial height of the scattered light spot on the upper and lower surfaces of the measured lens 12 and the height difference between the scattered light spots on the upper and lower surfaces of the measured lens 12 is the physical thickness D0 of the lens center;

(5) turning off the first light source component 1, then turning on the first monochromatic LED test light source 13-1, the second monochromatic LED test light source 13-2 and the third monochromatic LED test light source 13-3 so that at the same time, only one monochromatic LED test light source 13 is turned on, readjusting and moving positions of the movable reflection mirror 11 and recording the positions d21, d22, d23 of the movable reflection mirror 11 in each of the three cases when the interference phenomenon occurs again in the first photodetection component 7;

(6) calculating the refractive index nF, nd, and nC of the lens at different wavelengths according to the physical thickness D0 of the lens center and the parameters d11, d12, d13, d21, d22, and d23 of the lens center optical thickness with the formula $$nF = 1 + \frac{d21 - d11}{D0},$$

$$nd = 1 + \frac{d22 - d12}{D0},$$

$$nC = 1 + \frac{d23 - d13}{D0};$$

and then calculating a dispersion coefficient according to the refractive indices nF, nd, and nC with the formula $$Vd = \frac{nd}{nF - nC}.$$

We claim:

1. A lens refractive index detection device, comprising a light source module, a lens center physical thickness detection module, and a lens center optical thickness detection module, wherein the light source module includes a first light source component and a second light source component for outputting a collimated light beam, a first light combining component, and a focusing component, wherein the lens center physical thickness detection module includes a first imaging component and a second imaging component, and wherein the lens center optical thickness detection module includes a first photodetection component and a second photodetection component, a beam splitting component, a partial reflection mirror, and a movable reflection mirror, wherein the second photodetection component, the partial reflection mirror, the beam splitting component, the focusing component and the first light combining component are arranged along a first optical axis direction from front to back, wherein the movable reflection mirror is arranged on one side of the beam splitting component, the first photodetection component is disposed on the other side of the beam splitting component, and a focal surface of the focusing component is located between the beam splitting component and the partial reflection mirror for placing a measured lens, wherein the first imaging component and the second imaging component are respectively arranged above and below the measured lens, and the collimated light beams output by the first light source component and the second light source component both pass through the first light combining component and transmit along the first optical axis direction, a collimated beam transmitted by the first light source component along the first optical axis direction is focused by the focusing component on the measured lens while scattered light spots generated by the upper and lower surfaces of the measured lens are detected by the first imaging component and the second imaging component, wherein the focused light beam from the first light source component is also transmitted to the second photodetection component through the partial reflection mirror, and wherein the collimated light beam transmitted in the first optical axis direction from the second light source component passes through the beam splitting component and gets divided into two beams, one beam is projected on the movable reflection mirror and returns by reflection of the movable reflection mirror, and it is further transmitted by the beam splitting component to the first photodetection component, the other beam is projected on the partial reflection mirror and returns by reflection of the partial reflection mirror, and it is also reflected to the first photodetection component via the beam splitting component, and the two returned beams enter the first photodetection component for detecting an interference phenomena.

2. The lens refractive index detection device according to claim 1, wherein the first light combining component comprises a transflective first beam splitter, the first light source component is disposed behind the first beam splitter, and wherein the collimated light beam outputted by the first light source component is projected onto the first beam splitter along the first optical axis direction and then transmitted, wherein the second light source component is disposed on one side of the first beam splitter, and wherein the collimated light beam output by the second light source component is projected onto the first beam splitter along a second optical axis direction perpendicular to the first optical axis direction and then reflected, wherein an angle between the side of the first beam splitter and the second optical axis direction is 45° when the second light source component is disposed on the right side of the first beam splitter, and wherein the angle between the side of the first beam splitter and the second optical axis direction is 135° when the second light source component is disposed on the left side of the first beam splitter.

3. The lens refractive index detection device according to claim 1, wherein the second light source component comprises one or more monochromatic LED test light sources, a light transmitting hole is provided in front of each of the monochromatic LED test light sources, a collimating lens is provided in front of each light transmitting hole, and each of the monochrome LED test light sources is provided on a back focus of the corresponding collimating lens, so that the light beam emitted by each monochromatic LED test light source through the light transmitting hole passes through the collimating lens and becomes a collimated beam, wherein the collimated light beam output by the monochromatic LED test light source is projected to the first beam splitter in the second optical axis direction perpendicular to the first optical axis direction if the number of the monochromatic LED test light source is one, and the second light source component further includes a second light combing component disposed in front of the collimating lens for projecting each collimated beam output from each monochromatic LED test light source through a collimating lens in different directions onto the first beam splitter along a second optical axis direction perpendicular to the first optical axis direction if the number of the monochromatic LED test light sources is 2 or more.

4. The lens refractive index detection device according to claim 3, wherein the number of the monochromatic LED test light source is one, and the center of the first beam splitter, the center of the collimating lens, the center of the light transmitting hole, and the center of the monochromatic LED test light source are all located in the second optical axis direction perpendicular to the first optical axis direction.

5. The lens refractive index detection device according to claim 3, wherein the number of the monochromatic LED test light sources is three, and respectively includes a first monochromatic LED test light source, a second monochrome LED test light source, and a third monochrome LED test light source, the first, second, and third monochrome LED test light sources emit green, yellow, and red light respectively, wherein the center of the first monochromatic LED test light source, a center of a corresponding first light transmitting hole a center of the first collimating lens and the center of the first beam splitter are all located in a second optical axis direction perpendicular to the first optical axis direction, wherein the second light combining component includes a transflective second beam splitter disposed between the first collimating lens and the first beam splitter, and a transflective third beam splitter between the first beam splitter the second beam splitter, wherein a center of the second monochromatic LED test light source, a center of a corresponding second light transmitting hole, a center of the second collimating lens, and the center of the second beam splitter are located on a third optical axis direction perpendicular to the second optical axis direction, the center of the third monochromatic LED test light source, a center of a corresponding third light transmitting hole, a center of a third collimating lens and the center of the third beam splitter are located in a fourth optical axis direction perpendicular to the second optical axis direction, and wherein an angle between the second beam splitter/third beam splitter and the second optical axis direction is 45° when the second monochromatic LED test light source/the third monochromatic LED test light source are positioned above the second optical axis direction, and wherein an angle between the second beam splitter/third beam splitter and the second optical axis direction is 135° when the second monochromatic LED test light source/the third monochromatic LED test light source are positioned below the second optical axis direction.

6. The lens refractive index detection device according to claim 1, wherein the first imaging component and the second imaging component are both cameras with an oblique lens, an angle between the optical axis direction of the oblique lens with respect to the first optical axis direction and an angle between the optical axis direction of the oblique lens and the imaging chip plane of the camera meet the object-image conjugate relationship for oblique imaging of the imaging lens.

7. The lens refractive index detection device according to claim 1, wherein the beam splitting component comprises a transflective fourth beam splitter, a center of the first photodetection component, a center of the fourth beam splitter and the center of the movable reflection mirror are all located in a fifth optical axis direction perpendicular to the first optical axis direction, and wherein an angle between the side of the fourth beam splitter and the fifth optical axis direction is 45° when the movable reflection mirror is disposed on the left side of the fourth beam splitter, and wherein an angle between the side of the fourth beam splitter and the fifth optical axis direction is 135° when the movable reflection mirror is disposed on the right side of the fourth beam splitter.

8. A method for detecting the refractive index of a lens which comprises the following steps:

(1) turning off a second light source component, turning on a first light source component, and monitoring the spot position of the light beam of the first light source component with the second photodetection component as a reference position;

(2) turning off the first light source component, turning on the second light source component, detecting an interference phenomenon by the first photodetection component, and recording the position d1 of the movable reflection mirror when the interference phenomenon occurs in the first photodetection component;

(3) turning off the second light source component, inserting the measured lens, turning on the first light source component, and monitoring the actual light beam of the first light source component with the second photodetection component, wherein the spot center position is compared with the reference position obtained in step, and the user is guided to adjust the position of the measured lens according to the deviation between the two, when the position of the actual spot center of the light beam of the first light source component coincides with the reference position, the center of the measured lens coincides with the center of the optical path and the position adjustment of the measured lens is completed;

(4) imaging the scattered light on the upper and lower surfaces of the measured lens by the first imaging component and the second imaging component respectively to find the spatial height of the scattered light spot on the upper and lower surfaces of the measured lens and the height difference between the scattered light spots on the upper and lower surfaces of the measured lens is the physical thickness D0 of the lens center;

(5) turning off the first light source component, turning on the second light source component, readjusting the position of the movable reflection mirror and recording a position d2 of the movable reflection mirror when the interference phenomenon occurs again in the first photodetection component; and (6) calculating the refractive index of the measured lens according to the lens center physical thickness D0 and the lens center optical thickness related parameters d1 and d2 with the calculation formula $$n = 1 + \frac{d2 - d1}{D0}.$$

9. A method for detecting the refractive index of a lens which comprises the following steps:

(1) turning off a second light source component, turning on a first light source component, and monitoring the spot position of the light beam of the first light source component with the second photodetection component as a reference position;

(2) turning off the first light source component, turning on the first monochrome LED test light source, the second monochrome LED test light source, and the third monochrome LED test light source, the first, second, and third monochromatic LED test light sources emitting green, yellow, and red light, respectively, wherein only one monochromatic LED test light source is turned on at the same time, the first photodetection component detects an interference phenomenon separately for each monochrome LED test light source, and records the positions d11, d12, d13 of the movable reflection mirror when the interference phenomenon occurs in the first photodetection component;

(3) turning off all monochromatic LED test light sources, inserting the measured lens, turning on the first light source component, monitoring the actual spot center position of the light source component with the second photodetection component, wherein the actual spot center position of the beam is compared with the reference position obtained in step, and the user is guided to adjust the position of the measured lens according to the deviation between the two, when the actual spot center position coincides with the reference position, the center of the measured lens coincides with the center of the optical path, and the position adjustment of the measured lens is completed;

(4) imaging the scattered light on the upper and lower surfaces of the measured lens by the first imaging component and the second imaging component respectively to find the spatial height of the scattered light spot on the upper and lower surfaces of the measured lens and the height difference between the scattered light spots on the upper and lower surfaces of the measured lens is the physical thickness D0 of the lens center;

(5) turning off the first light source component, then turning on the first monochromatic LED test light source, the second monochromatic LED test light source and the third monochromatic LED test light source, wherein at the same time, only one monochromatic LED test light source is turned on, readjusting and moving positions of the movable reflection mirror and recording the positions d21, d22, d23 of the movable reflection mirror in each of the three cases when the interference phenomenon occurs again in the first photodetection component;

(6) calculating the refractive index nF, nd, and nC of the lens at different wavelengths according to the physical thickness D0 of the lens center and the parameters d11, d12, d13, d21, d22, and d23 of the lens center optical thickness with the formula $$nF = 1 + \frac{d21 - d11}{D0},$$

$$nd = 1 + \frac{d22 - d12}{D0},$$

$$nC = 1 + \frac{d23 - d13}{D0};$$

and then calculating a dispersion coefficient according to the refractive indices nF, nd, and nC with the formula $$Vd = \frac{nd}{nF - nC}.$$

* * * * *